United States Patent
Chen et al.

(10) Patent No.: US 9,749,586 B2
(45) Date of Patent: *Aug. 29, 2017

(54) INTEGRATION OF HOME ENTERTAINMENT DEVICES WITH A SOFTWARE CLIENT FOR TELEPHONY

(71) Applicant: AT&T Intellectual Property II, L.P., Atlanta, GA (US)

(72) Inventors: Yihsiu Chen, Middletown, NJ (US); Mark J. Foladare, East Brunswick, NJ (US); Shelley B. Goldman, East Brunswick, NJ (US); Thaddeus Julius Kowalski, Summit, NJ (US)

(73) Assignee: AT&T INTELLECTUAL PROPERTY II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/983,144

(22) Filed: Dec. 29, 2015

(65) Prior Publication Data

US 2016/0212380 A1 Jul. 21, 2016

Related U.S. Application Data

(63) Continuation of application No. 13/858,837, filed on Apr. 8, 2013, now Pat. No. 9,232,181, which is a
(Continued)

(51) Int. Cl.
*H04N 7/14* (2006.01)
*H04N 7/15* (2006.01)
(Continued)

(52) U.S. Cl.
CPC ............ *H04N 7/15* (2013.01); *H04M 7/0066* (2013.01); *H04M 7/0069* (2013.01); *H04N 7/147* (2013.01); *H04N 7/173* (2013.01); *H04N 21/4223* (2013.01); *H04N 21/42203* (2013.01); *H04N 21/4788* (2013.01)

(58) Field of Classification Search
CPC ...... H04M 3/56–3/569; H04M 7/0066; H04M 7/0069; H04M 2203/50–2203/509; H04M 2203/1066; H04M 2203/257; H04N 7/147; H04N 7/15; H04N 7/173; H04N 21/42203; H04N 21/4223; H04N 21/4788
USPC ........................ 348/14.01–14.16; 379/90.01, 379/102.01–102.03, 201.01; 709/201–207, 217–248; 370/259–271, 370/351–357
See application file for complete search history.

(56) References Cited

U.S. PATENT DOCUMENTS 6,882,709 B1 4/2005 Sherlock et al.
7,006,613 B2 2/2006 Novak et al.
(Continued)

*Primary Examiner* — Hemant Patel

(57) ABSTRACT

A communication system including a communication network, an entertainment device connected to the communication network, and an application server connected to the communication network. The entertainment device has a software client adapted to provide real time two-way communication between the entertainment device and a telephony device connected to the communication network. The application server is adapted to communicate with the software client and facilitate the real time two-way communication between the entertainment device and the telephony device.

18 Claims, 3 Drawing Sheets

Related U.S. Application Data continuation of application No. 12/938,370, filed on Nov. 2, 2010, now Pat. No. 8,416,273, which is a continuation of application No. 10/746,604, filed on Dec. 23, 2003, now Pat. No. 7,843,485.

(51) Int. Cl.
*H04M 7/00* (2006.01)
*H04N 7/173* (2011.01)
*H04N 21/422* (2011.01)
*H04N 21/4223* (2011.01)
*H04N 21/4788* (2011.01)

(56) References Cited

U.S. PATENT DOCUMENTS

| | | |
|---|---|---|
| 7,058,356 B2 | 6/2006 | Slotznick |
| 7,447,740 B2 | 11/2008 | AbiEzzi et al. |
| 7,565,680 B1 | 7/2009 | Asmussen |
| 7,843,485 B1 | 11/2010 | Chen et al. |
| 8,416,273 B2 | 4/2013 | Chen et al. |
| 9,232,181 B2 * | 1/2016 | Chen ............... H04M 7/0066 |
| 2002/0075382 A1 | 6/2002 | Cohen |
| 2002/0086734 A1 | 7/2002 | Krishnan et al. |
| 2002/0147986 A1 | 10/2002 | Michael et al. |
| 2003/0041333 A1 | 2/2003 | Allen et al. |
| 2003/0232648 A1 | 12/2003 | Prindle |
| 2004/0203835 A1 | 10/2004 | Trottier et al. |
| 2005/0066362 A1 | 3/2005 | Rambo |
| 2006/0035711 A1 | 2/2006 | Samuels |
| 2006/0088145 A1 | 4/2006 | Reed et al. |
| 2006/0130116 A1 | 6/2006 | Shi et al. |

* cited by examiner

INTEGRATION OF HOME ENTERTAINMENT DEVICES WITH A SOFTWARE CLIENT FOR TELEPHONY

CROSS REFERENCE TO RELATED APPLICATIONS

This application is a continuation of U.S. patent application Ser. No. 13/858,837, filed Apr. 8, 2013, now U.S. Pat. No. 9,232,181, which is a continuation of U.S. patent application Ser. No. 12/938,370, filed Nov. 2, 2010, now U.S. Pat. No. 8,416,273, which is a continuation of U.S. patent application Ser. No. 10/746,604, filed Dec. 23, 2003, now U.S. Pat. No. 7,843,485; all of which are herein incorporated by reference in their entirety.

BACKGROUND OF THE INVENTION

The present invention is directed to the use of home entertainment devices to provide telephony services, in particular, but not by way of limitation, to the integration of a home entertainment device with a software client in order to provide real time two-way communication services.

The availability of broadband communication networks has proliferated greatly in recent years. Consumers may currently 'choose from a variety of broadband providers including cable companies, telephone companies, satellite broadband providers, and DSL providers. Due to the increasing availability of broadband communication infrastructures, it has become possible to provide a greater number of entertainment and communication services to consumers. For example, Internet telephony and video conferencing applications currently enjoy great popularity. In addition, there has been an increasing desire towards the integration of entertainment and telephony services in the home. Thus, there exists a need to provide the integration of broadcast communication with real time two-way communications by enabling home entertainment devices with the capability of providing real time communications services.

BRIEF SUMMARY OF THE INVENTION

In accordance with an embodiment of the present invention there is provided a communication system including a communication network, an entertainment device connected to the communication network, and an application server connected to the communication network. The entertainment device has a software client adapted to provide real time two-way communication between the entertainment device and a telephony device connected to the communication network. The application server is adapted to communicate with the software client and facilitate the real time two-way communication between the entertainment device and the telephony device.

In accordance with another embodiment of the present invention there is provided an entertainment device having a first connection, the first connection being adapted to connect the entertainment device to a communication network, a microprocessor, and a memory adapted to store a software client for execution by the microprocessor. The software client is adapted to provide real time two-way communication between the entertainment device and a telephony device connected to the communication network, and communicate with an application server connected to the communication network. The application server is adapted to communicate with the software client and facilitate the real time two-way communication between the entertainment device and the telephony device.

In accordance with still another embodiment of the present invention there is provided an application server having a first connection adapted to connect the application server to a communication network. The application server is adapted to communicate with a software client associated with an entertainment device and facilitate real time two-way communication between the entertainment device and a telephony device. The entertainment device is connected to the communication network, and the software client associated with the entertainment device is adapted to provide real time two-way communication between the entertainment device and a telephony device connected to the communication network.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art.

Figure 1:
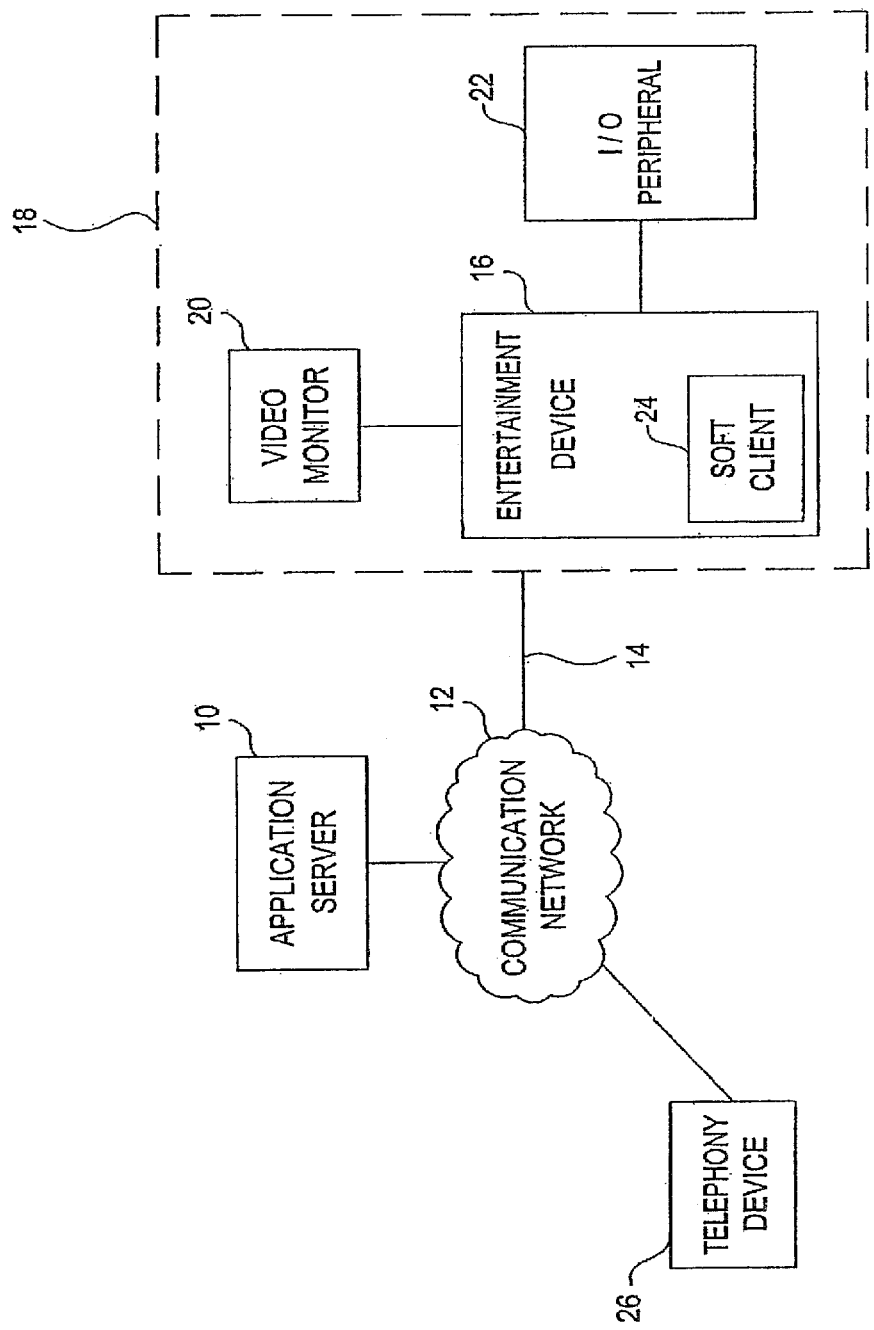
FIG. 1 illustrates a telecommunication system in accordance with an embodiment of the present invention.

Referring now to FIG. 1, a telecommunication system in accordance with an embodiment of the present invention is illustrated. The telecommunication system includes an application server 10 connected to a communication network 12. Examples of the communication network 12 that can be used in accordance with at least one embodiment of the present invention include, for example, the Internet, a cable network, ISDN, a DSL network, a public switched telephone network (PSTN), a local area network, a combination of networks, etc. The communication network 12 is further connected to an entertainment device 16 in a customer premises 18 via a communication network link 14, such as, for example, a cable connection, a DSL connection, other types of broadband connections, a satellite connection, a public switched telephone network (PSTN) connection, etc. Examples of the entertainment device 16 that can be used with at least one embodiment of the present invention may include, for example, a set-top box, an entertainment console, an Internet appliance, and other types of networking capable entertainment devices. The entertainment device 16 further has an associated network identifier that enables the entertainment device 16 to be addressable from the communication network 12 so that it may send data to and receive data from devices connected to the communication network 12.

The entertainment device 16 is further connected to a video monitor 20 for displaying video output signals from the entertainment device 16. Examples of the video monitor 20 that can be used with at least one embodiment of the present invention might include, for example, a television or a computer monitor. In addition, although not required, the video monitor 20 may further be provided with speakers to reproduce an audio output signal from the entertainment device 16. In at least one embodiment of the present invention, the entertainment device 16 may be provided with an integral display screen instead of, or in addition to, the video monitor 20. The entertainment device 16 is further connected to at least one input/output peripheral 22 to allow a user to interact with the entertainment device 16. Examples of the at least one input/output peripheral that can be used with at least one embodiment of the present invention might include a microphone, speakers, headphones, a keyboard, a video camera, a still camera, a controller, etc. In at least one embodiment of the present invention, the entertainment device 16 may be provided with a connection for attachment of telephony equipment such as a telephone.

The entertainment device 16 includes a software client 24, that when executed on a microprocessor in the entertainment device 16, enables the entertainment device 16 under control of the application server 10, to provide telephony, video conferencing, and other real time two-way communication services to a user using at least one of the video monitor 20 and the at least one input/output peripheral 22. In at least one embodiment of the present invention, the software client 24 may be provided to the entertainment device 16 by being downloaded from the application server 10 or another server connected to the communication network 12. In at least one other embodiment of the present invention, the software client 24 may be built into firmware memory in the entertainment device 16, or loaded into a memory of the entertainment device 16 by a user, such as, for example, by inserting an application disc containing the software client 24 into the entertainment device 16. Examples of functions of the entertainment device 16 that may be enabled by the software client 24 include software phones to enable telephony and video conferencing applications to enable video conferencing and collaboration. Updates to the software client 24 may be provided by the application server 10 or from another server connected to the communication network 12.

The application server 10 is further capable of communicating contact, control, video and audio information in real time to allow the initiation of two-way communications between a user of the entertainment device 16 and another party. In an example call in accordance with an embodiment of the present invention, a caller using a telephony device 26 connected to the communication network 12 that wishes to communicate with a user of the entertainment device 16 dials a number associated with the entertainment device 16. The outgoing call is routed by the communication network 12 to the application server 10, which then communicates with the software client 24 to alert the user of the entertainment device 16 that an incoming call exists. Upon the user answering the incoming call, the software client 24 communicates to the application server 10 that the call has been answered. In response, the application server 10 facilitates the establishment of the two-way communication between the caller using the telephony device 26 and the user of the entertainment device 16. In another example call in accordance with an embodiment of the present invention, a user of the entertainment device 16 may place an outgoing call to a called party connected to the communication network 12. In this case, the outgoing call is routed to the application server 10 before being placed to the called party.

In an exemplary embodiment of the present invention, the entertainment device 16 may be provided with a memory buffer, for example, solid-state memory or at least one hard disk, for the temporary storage of received two-way communication or entertainment information. Through use of the memory buffer, the entertainment device 16 may be provided with the capability of temporary interrupting the presentation of entertainment information to a user of the entertainment device 16 in order to receive an incoming call or place an outgoing call. During the duration of the call, entertainment information received by the entertainment device 16 may be temporarily stored in the memory buffer. Upon completion of the call, the entertainment device 16 may then resume presentation of the entertainment information to the user at the point at which it was interrupted. For example, in an exemplary embodiment in which the entertainment device 16 comprises a set-top box, a user viewing a television program or movie using the set-top box may be alerted to an incoming call. Upon answering the call by the user, the entertainment device 16 begins storing the television program or movie in the memory buffer. Upon completion of the call, the user may continue viewing the television program or movie at the point of interruption.

Alternately, if the user does not wish to have the presentation of the entertainment information interrupted by an incoming call, the memory buffer may provide for storage of information related to the incoming call, such as for example, a voice mail or caller identification information. A determination regarding whether the two-way communication or entertainment information is presented to the user may be made based upon assigning an application priority level to particular two-way communication or entertainment applications. For example, if a user desires that a particular entertainment presentation not be interrupted by an incoming call, the entertainment presentation can be assigned a higher priority level by the user than an incoming call. In addition, a user may assign different priority levels to individual callers. For example, a user may desire that an incoming call from a particular user always interrupts an entertainment presentation, while incoming calls from other callers are directed to a voice mail box.

Figure 2:
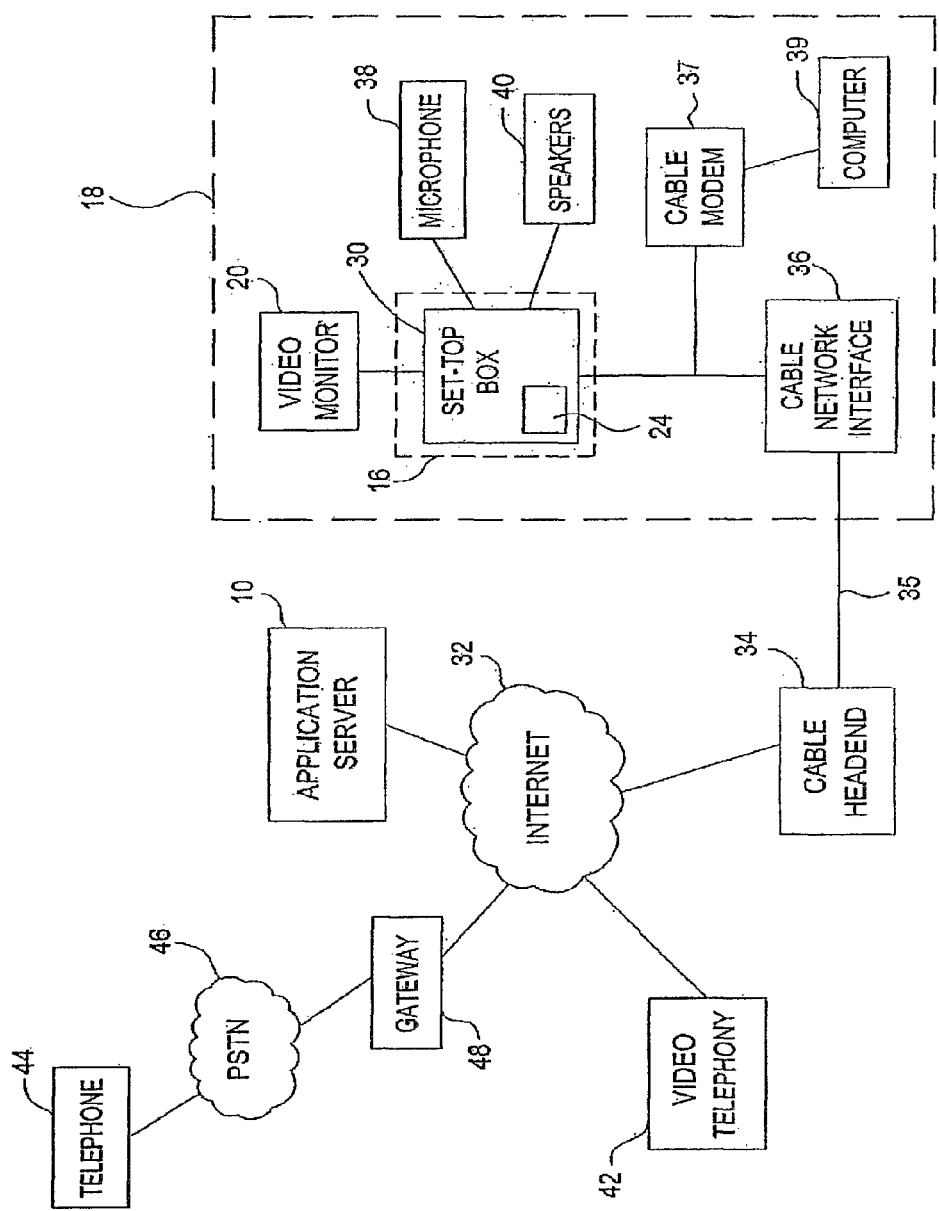
FIG. 2 Illustrates an exemplary embodiment of the telecommunication system of FIG. 1.

Referring now to FIG. 2, an exemplary embodiment of the telecommunication system of FIG. 1 is illustrated. In the telecommunication system illustrated in FIG. 2 the entertainment device 16 further comprises a set-top box 30. The telecommunication system includes an application server 10 connected to the Internet 32. However, it should be understood that other embodiment of the present invention may make use of other types of communication networks, such as, for example, cable networks, ISDN, DSL networks, a public switched telephone network (PSTN), local area networks, etc. A cable headend is further connected between the Internet 32 and a cable network interface 36 in a customer premises 18 to supply television programming and network connectivity to the set-top box 30 via a cable network 35. The cable network interface 36 may also be connected to a cable modem 37 to provide cable network connectivity to a connected computer 39.

The set-top box 30 is further connected to a video monitor 20 for displaying video output signals from the set-top box 30. Examples of the video monitor 20 that can be used with at least one embodiment of the present invention might include, for example, a television or a computer monitor. In addition, although not required, the video monitor 20 may further be provided with speakers to reproduce an audio output signal from the set-top box 30. The set-top box 30 may be further connected to at least one input/output peripheral such as, for example, a microphone 38, speakers 40, headphones, a keyboard, a video camera, a still camera, etc. to allow the user to interact with the set-top box 30 in order to perform two-way communication functions.

The set-top box 30 further includes a software client 24, that when executed on a microprocessor in the set-top box 30, enables the set-top box 30 under control of the application server 10 to provide telephony, video conferencing, and other real time two-way communication services to a user using at least one of the video monitor 20, the microphone 39, the speakers 40, or any other associated peripheral devices. In at least one embodiment of the present invention the software client may be provided to the set-top box 30 by being downloaded from the application server 10, another server connected to the Internet 32, or a server connected to the cable network 35. Examples of functions of the set-top box 30 that may be enabled by the software client 24 include software phones to enable telephony, and video conferencing applications to enable video conferencing and collaboration. Updates to the software client 24 may be provided either by the application server 10, another server connected to the Internet 32, or a server connected to the cable network 35.

The application server 10 is further capable of communicating contact, control, video, and audio information in real time to allow the initiation of two-way communications between a user of the set-top box 30 and another party. In accordance with at least one embodiment of the present invention the set-top box 30 may communicate with the application server 10 using a parallel data channel such that broadband two-way communication and broadband video, such as that provided by cable television programming, use different communication channels in the cable network 35. In an example call in accordance with an embodiment of the present invention, a caller using a video telephony device 42 connected to the Internet 32 places a video conferencing call to a user of the set-top box 30. The outgoing call is routed to the application server 10 via the Internet 32, which then communicates with the software client 24 to alert the user of the set-top box 30 that an incoming call exists. Upon the user answering the incoming call, the software client 24 communicates to the application server 10 that the call has been answered. In response, the application server 10 facilitates the establishment of a two-way video conferencing session between the caller using the video telephony device 42 and the user of the set-top box 30.

In another example call in accordance with an embodiment of the present invention, a caller using a telephone 44 connected to the Internet 32 via a public switched telephone network (PSTN) 46 and a gateway 48, places a telephone call to a user of the set-top box 30. The outgoing call is routed to the application server 10, which then communicates with the software client 24 to alert the user of the set-top box 30 that an incoming call exists. Upon the user answering the incoming call, the software client 24 communicates to the application server 10 that the call has been answered. In response, the application server 10 facilitates the establishment of a two-way telephone call between the caller using the telephone 44 and the user of the set-top box 30. In present example, the caller using the telephone 44 may use, for example, plain old telephone service (POTS) or voice over IP (VoIP) technologies to conduct the call. In another example call in accordance with an embodiment of the present invention, a user of the set-top box 30 may place an outgoing call to a called party connected to the Internet 32 or another communication network such as a PSTN 46. In this case, the outgoing call is routed to the application server 10 before being placed to the called party.

Figure 3:
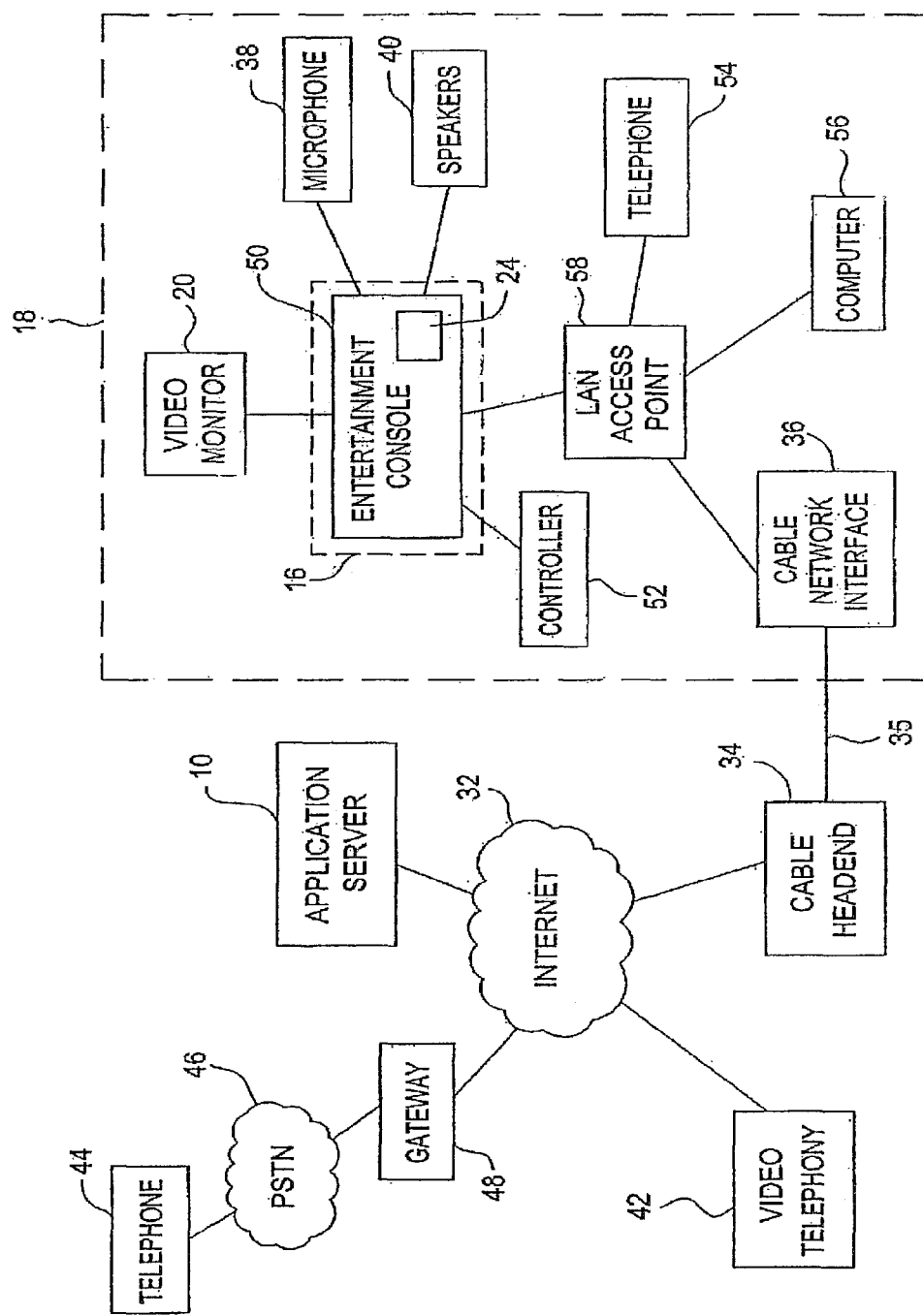
FIG. 3 illustrates another exemplary embodiment of the telecommunication system of FIG. 1.

Referring now to FIG. 3, another exemplary embodiment of the telecommunication system of FIG. 1 is illustrated. In the telecommunication system illustrated in FIG. 3 the entertainment device 16 further comprises a networking capable entertainment console 50, such as a video game console. The telecommunication system includes an application server 10 connected to the Internet 32. However, it should be understood that other embodiment of the present invention may make use of other types of communication networks, such as, for example, cable networks, ISDN, DSL networks, a public switched telephone network (PS1N), local area networks, etc. A cable headend is further connected between the Internet 32 and a cable network interface 36, such as for example, a cable modem, in a customer premises 18 to supply television programming and network connectivity to a local area network (LAN) access point 58 via a cable network 35. The LAN access point 58 functions to distribute network connectivity to at least one network enable device in a local area network. It should be understood that in at least one embodiment of the present invention the LAN access point 58 may include of a variety of network devices such as, for example, a wireless access point, a router, an Ethernet hub, etc. The entertainment console 50 is connected using, for example, a wired connection or a wireless connection, to the LAN access point 58 to provide networking access to the entertainment console 50 via the cable network 35. Additional devices such as a telephone 54 and a computer 56 may also be connected to the LAN access point 58.

The entertainment console 50 is further connected to a video monitor 20 for displaying video output signals from the entertainment console 50. Examples of the video monitor 20 that can be used with at least one embodiment of the present invention might include, for example, a television or a computer monitor. In addition, although not required, the video monitor 20 may further be provided with speakers to reproduce an audio output signal from the entertainment console 50. In at least one embodiment of the present invention, the entertainment console 50 may be provided with an integral display screen instead of, or in addition to, the video monitor 20. The entertainment console 50 may be further connected to at least one input/output peripheral including a microphone 38, speakers 40, a controller 52, headphones, a keyboard, a video camera, a still camera, etc. to allow a user to interact with the entertainment console 50.

The entertainment console 50 further includes a software client 24, that when executed on a microprocessor in the entertainment console 50, enables the entertainment console 50 under control of the application server 10 to provide telephony, video conferencing, and other real time two-way communication services to a user using at least one of the video monitor 20, the microphone 39, the speakers 40, or any other associated peripheral devices. In at least one embodiment of the present invention the software client may be provided to the entertainment console 50 by being downloaded from the application server 10, another server connected to the Internet 32, or a server connected to the cable network 35. In at least one other embodiment of the present invention, the software client 24 may be built into firmware memory in the entertainment device 16, or loaded into a memory of the entertainment console 50 by a user, such as, for example, by inserting a application disc containing the software client 24 into the entertainment console 50. Examples of functions of the entertainment console 50 that may be enabled by the software client 24 include software phones to enable telephony, and video conferencing applications to enable video conferencing. Updates to the software client 24 may be provided either by the application server 10, another server connected to the Internet 32, or a server connected to the cable network 35.

The application server 10 is further capable of communicating contact, control, video, and audio information in real time to allow the initiation of two-way communications between a user of the entertainment console 50 and another party. In an example call in accordance with an embodiment of the present invention, a caller using a video telephony device 42 connected to the Internet 32 places a video conferencing call to a user of the entertainment console 50. The outgoing call is routed to the application server 10, which then communicates with the software client 24 to alert the user of the entertainment console 50 that an incoming call exists. Upon the user answering the incoming call, the software client 24 communicates to the application server 10 that the call has been answered. In response, the application server 10 facilitates the establishment of a two-way video conferencing session between the caller using the video telephony device 42 and the user of the entertainment console 50.

In another example call in accordance with an embodiment of the present invention, a caller using a telephone 44 connected to the Internet 32 via a public switched telephone network (PSTN) 46 and a gateway 48, places a telephone call to a user of the entertainment console 50. The outgoing call is routed to the application server 10, which then communicates with the software client 24 to alert the user of the entertainment console 50 that an incoming call exists. Upon the user answering the incoming call, the software client 24 communicates to the application server 10 that the call has been answered. In response, the application server 10 facilitates the establishment of a two-way telephone call between the caller using the caller using the telephone 44 and the user of the entertainment console 50. In another example call in accordance with an embodiment of the present invention, a user of the entertainment console 50 may place an outgoing call to a called party connected to the Internet 32 or another communication network such as a PSTN 46. In this case, the outgoing call is routed to the application server 10 before being placed to the called party.

In still another embodiment of the present invention, a plurality of entertainment devices as described in at least one of the embodiments of the invention may be used at a single customer premises. For example, a primary entertainment device and one or more secondary entertainment devices having a subset of the features of the primary entertainment device may be connected to a LAN and distributed throughout the customer premises. The primary entertainment device may have the capability of providing, for example, both voice telephony and video conferencing capability, while the secondary entertainment device may provide voice telephony only. Alternately, the one or more secondary entertainment devices may be provided with the full capabilities of the primary entertainment device.

In another exemplary embodiment of the present invention, a primary entertainment device having an integrated wireless LAN hub may be connected to the communication network, for example via a cable network interface, at the customer premises. One or more secondary entertainment devices having a wireless connection to the primary entertainment device may be distributed throughout the customer premises, and be provided with access to the communication network through the wireless connection to the primary entertainment device. The one or more secondary entertainment devices may be provided with one of, some of, or all of the capabilities of the primary entertainment device An advantage that is provided by at least one embodiment of the present invention is that it conveniently allows telephone, video conferencing, and other real time communication services to be used from a living room of a customer premises. Another advantage that is provided by at least one embodiment of the present invention is that it allows the integration of telecommunication and televisions services for a user.

The previous description is of a preferred embodiment for implementing the invention, and the scope of the invention should not necessarily be limited by this description. The scope of the present invention is instead defined by the following claims.

What is claimed is:

1. A method comprising:
   providing, by a microprocessor of a first entertainment device, a two-way communication between the first entertainment device and a telephony device in communication with a communication network;
   communicating, by the microprocessor, through a first connection with an application server connected to the communication network, the application server for communicating with a software client of the first entertainment device and facilitating the two-way communication between the first entertainment device and the telephony device; and
   connecting, by the microprocessor, the first entertainment device to a secondary entertainment device, wherein the first entertainment device facilitates access by the secondary entertainment device to the telephony device in communication with the communication network through a second connection with the first entertainment device, wherein the first entertainment device comprises a set top box, wherein the secondary entertainment device comprises a video game console for providing a voice telephony to the telephony device.

2. The method of claim 1, wherein the first entertainment device is in communication with the communication network via a cable network interface.

3. The method of claim 1, further comprising:
   connecting to a peripheral, the peripheral for allowing a user to interact with the first entertainment device.

4. The method of claim 1, wherein the two-way communication comprises video conferencing.

5. The method of claim 1, wherein the first connection comprises a two-way video conferencing session.

6. The method of claim 1, further comprising:
   including an associated network identifier that enables the first entertainment device to be addressable by a device in communication with the communication network.

7. The method of claim 1, further comprising:
   interrupting and storing a current presentation of entertainment information in a memory when the two-way communication between the first entertainment device and the telephony device is established; and
   storing information related to an incoming call in the memory when the current presentation of the entertainment information is not interrupted.

8. A non-transitory computer-readable storage medium storing instructions which, when executed by a microprocessor of a first entertainment device, cause the processor to perform operations, the operations comprising:

provided a two-way communication between the first entertainment device and a telephony device in communication with a communication network;

communicating through a first connection with an application server connected to the communication network, the application server for communicating with a software client of the first entertainment device and facilitating the two-way communication between the first entertainment device and the telephony device; and connecting the first entertainment device to a secondary entertainment device, wherein the first entertainment device facilitates access by the secondary entertainment device to the telephony device in communication with the communication network through a second connection with the first entertainment device, wherein the first entertainment device comprises a set top box, wherein the secondary entertainment device comprises a video game console for providing a voice telephony to the telephony device.

9. The non-transitory computer-readable storage medium of claim 8, wherein the first entertainment device is in communication with the communication network via a cable network interface.

10. The non-transitory computer-readable storage medium of claim 8, the operations further comprising:
connecting to a peripheral, the peripheral for allowing a user to interact with the first entertainment device.

11. The non-transitory computer-readable storage medium of claim 8, wherein the two-way communication comprises video conferencing.

12. The non-transitory computer-readable storage medium of claim 8, wherein the first connection comprises a two-way video conferencing session.

13. The non-transitory computer-readable storage medium of claim 8, the operations further comprising:
including an associated network identifier that enables the first entertainment device to be addressable by a device in communication with the communication network.

14. The tangible non-transitory computer-readable storage medium of claim 8, the operations further comprising:
interrupting and storing a current presentation of entertainment information in a memory when the two-way communication between the first entertainment device and the telephony device is established; and
storing information related to an incoming call in the memory when the current presentation of the entertainment information is not interrupted.

15. A method comprising:
connecting, by a processor of an application server, the application server to a communication network, the application server for communicating with a software client associated with a first entertainment device; and
facilitating, by the processor, a two-way communication between the first entertainment device and a telephony device in communication with the communication network;
wherein the first entertainment device is in communication with the communication network, and the software client associated with the first entertainment device is for providing the two-way communication between the first entertainment device and the telephony device; and
wherein the first entertainment device facilitates access by a secondary entertainment device to the telephony device in communication with the communication network through a connection with the first entertainment device, wherein the first entertainment device comprises a set top box, wherein the secondary entertainment device comprises a video game console for providing a voice telephony to the telephony device.

16. The method of claim 15, wherein the two-way communication comprises video conferencing.

17. The method of claim 15, further comprising:
providing the software client to the first entertainment device.

18. The method of claim 15, further comprising:
communicating contact information to the first entertainment device.

* * * * *